Feb. 26, 1929.
J. L. McGRANE
1,703,775
DIRECTION INDICATING SIGNAL FOR AUTOMOBILES
Filed Jan. 26, 1928
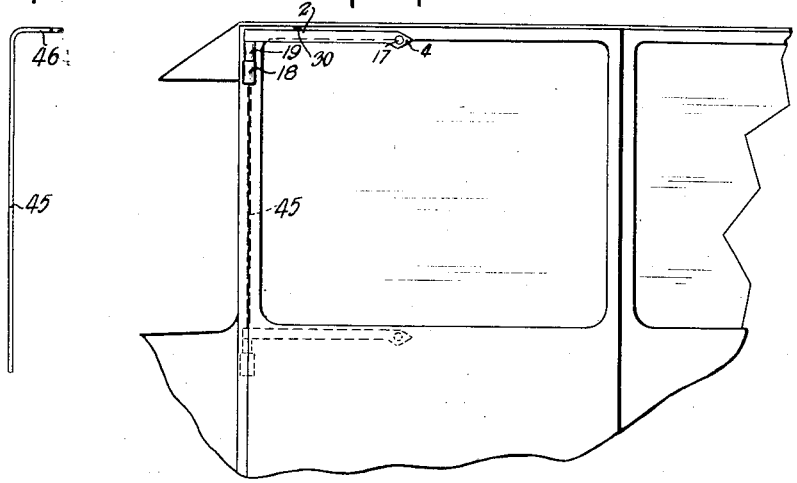
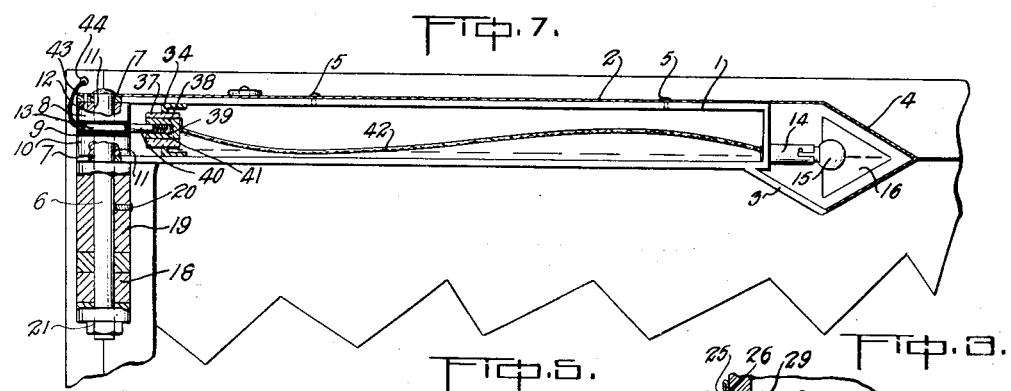
INVENTOR
JAMES L. McGRANE Patented Feb. 26, 1929.

1,703,775

UNITED STATES PATENT OFFICE.

JAMES LEO McGRANE, OF BUFFALO, NEW YORK.

DIRECTION-INDICATING SIGNAL FOR AUTOMOBILES.

Application filed January 26, 1928. Serial No. 249,716.

My invention relates to improvements in direction indicating signals for automobiles, and the object of the invention is to construct a simple apparatus of this nature which can be readily mounted upon any standard closed automobile body with the minimum of trouble and expense and which will not in any way mar the body or detract from its appearance. A further object of the invention is to utilize one of the door hinges as a mounting for my direction indicator, the usual hinge pin being removed and a pivotal pin of my signal substituted in lieu thereof, and a further object of my invention is to provide a simple manual operating means for actuating my device which is so positioned within the car that it does not unnecessarily protrude or in any way detract from the appearance of the car interior.

My invention consists of a direction indicator constructed and arranged all as hereinafter more particularly described and illustrated in the accompanying drawing in which:

Fig. 1 is a side elevational view of a fragmentary portion of a closed automobile body showing the signal arm of my direction indicator positioned thereon, such signal arm is shown in two positions, the preferred position illustrated in full lines and the alternative position illustrated in dotted lines, the signal being in the inoperative position.

Fig. 2 is a plan sectional view of a fragmentary portion of the automobile body upon which my device is mounted, the signal being shown in the inoperative position in full lines and in the operative position in dotted lines.

Fig. 3 is a vertical sectional view of the portion of the automobile body illustrated in Fig. 2 showing my complete device which includes the swingable signal arm and the actuating means therefor.

Fig. 4 is a perspective view of the signal arm casing.

Fig. 5 is an enlarged plan view of the connection which extends through the automobile door and connects the actuating means with the signal arm, a fragmentary portion of the actuating means and the arm being shown.

Fig. 6 is an enlarged plan view of the electrical switch device by mean of which the electrical circuit is completed to illuminate the arm when it is moved into the operative position.

Fig. 7 is an enlarged side elevational view of a fragmentary portion of the upper corner of the automobile door showing my signal mounted thereon, the casing thereof being in section, and Fig. 8 is an elevational view of the signal arm supporting and rotating rod employed when my signal arm is mounted in the alternative position as illustrated in dotted lines in Figure 1.

Like characters of reference indicate corresponding parts of the different views.

The signaling portion of my device consists of a pivotally mounted arm adapted to lie horizontally along the outside of the top of an automobile door when in the inoperative position, and to swing forwardly in a horizontal plane to a position substantially at right angles to the door when operative or signaling.

My signal arm consists of an inner frame 1 and an outer casing 2, the inner frame being formed from a metal strip which is bent into substantially U-shaped form and furnished on its outer or closed end with a downwardly extending angularly inclined strip portion 3, the bottom portion of the frame and the downwardly extending strip portion 3 forming the lower face of the signal arm. The casing 2 is of substantially inverted U-shaped cross-section being open at its bottom and formed at its outer end to simulate an arrow head 4. The casing 2 is fitted over the frame 1 and held in its adjusted position by means of a plurality of screws 5 which pass through the upper face of the casing and are threaded into the upper portion of the frame.

As a means for mounting the signal arm upon the body, I utilize one of the hinges upon which the left hand door swings, substituting a pin 6 upon which my signal is pivotally mounted for the standard hinge pin. The upper end of this pin 6 projects through a pair of aligned orifices 7 in the inner end of the frame 1 so that such frame freely swings about the pin.

For keeping the upper and lower portions of the frame 1 in their spaced apart relation and also to provide an electrical contact means for the illumination of the signal arm, I furnish three circular spacing members 8, 9 and 10, each of which is formed with a central orifice 11, through which the pin 6 also extends, the members being secured in relation to the frame 1 by means of pins 12 which extend through the assembly. The center spacing member 9 is formed of insulating material and provided around portion of its periphery with a metal electrical contact strip 13 which is insulated from both the upper and lower spacing members 8 and 10 and also the pin 6. 14 is a lamp socket extending outwardly from the lower portion of the outer end of the frame 1 and provided with a lamp 15, the socket being so disposed that the lamp lies approximately in the center of the arrow head formed by the outer end of the casing 2, such arrow head being furnished upon its rear side with a triangular translucent portion 16 which is preferably colored red and a bull's eye lens 17 in its forward face which is preferably colored green. As the upper hinge member 18 of most automobile doors is below the lower edge of the top transverse door panel, I, in most cases, find it necessary to interpose a spacing member 19 between the top of the hinge and the lower portion of the signal so that the signal lies along the panel and not in front of the glass of the door. I find it preferable to hold this spacing member 19 against rotation upon the pin 6 and therefore provide a set screw 20 which is threaded into the member and bears against the pin. The lower end of the pin 6 is held in place in any suitable manner within the hinge such as by a nut 21 which is threaded thereunto as illustrated in the drawings.

For actuating the signal, I position a substantially U-shaped metal member 22 within the interior of the car which extends upwardly in the corner of the left hand windshield panel, being rotatably supported by a pair of metal straps 23 which are secured to the forward end 24 of the door. 25 is a connecting member which extends between the actuating member 22 and the signal, such member being preferably formed of suitably tempered wire of curved form as illustrated in Fig. 2 and passing through a suitable orifice 26 which is drilled through the top of the door. The inner end 27 of the member 25 is slidably mounted upon the upper horizontal end 28 of the actuating member 22, and 29 is a spiral spring positioned about the arm 28 and extending between the end 27 and the inner end of the arm 28. The outer end 30 of the member 25 is rotatably held upon a pin 31 which is threaded through the upper face of the casing 2 into the frame 1. The lower end 32 of the member 22 is designed with a handle 33 by means of which the member 22 is rotated. The electric lamp 15 contained within the outer end of the signal may be illuminated through the means of any suitable electric connection such as that illustrated in the drawing, wherein I have shown what appears to be a most simple and practical form incorporating the insulated member 9 and contact strip 13 before described. 34 is a vertical bridge piece extending between the upper and lower portions of the frame 1 in the vicinity of its inner end and carrying a short tube 37 formed of insulating material into which is fitted a metal plug 38 having a cylindrical recess 39 therein in which a plunger 40 is slidably mounted and resiliently held against the member 9 by a spiral spring 41. The strip 13 is so positioned within the member 9 that when the signal is in the inoperative position the plug 40 rests against the insulation, and when the signal is swung forwardly into the operative position the plunger passes around such member 9 until it comes into contact with the strip 13 and illuminates the electric bulb 15 through the medium of the plunger 40, plug 39 and flexible electric connection 42, which extends between the rear end of the plug 37 and the lamp socket 14. The signal is illuminated from one of the electrical circuits of the car by means of a connection wire 43 which passes through an orifice 44 in the door frame and connects such circuit with the strip 13.

If it is preferred to mount the signal in the vicinity of the center of the door at a point where the driver extends his hand when indicating a turn, it is merely necessary to remove the upper and center hinge pins and to provide a rod 45 in lieu thereof, which passes through both hinges and is turned over at its upper end to form a horizontal arm 46 which is connected to the end 26 of the member 25, the rod being adapted at its lower end to carry the signal arm which is secured thereto instead of being freely rotatable as in my preferred form. It will be readily understood in this alternative construction that the rod 45 will turn and swing the signal which is secured thereto.

When the driver of the car desires to indicate that he is about to make a left hand turn, it is merely necessary for him to pull the handle 33 rearwardly in a clockwise direction which will of course swing the arm 28 rearwardly in a clockwise direction and swing the signal forwardly through the medium of the connecting member 25. As the arm 28 and the signal arm move about different centers, it is necessary that the connecting member 25 be flexible and also slidable upon the arm 28 so that it may shape itself in accordance with the two movements. The spiral spring 29 has the dual function of retaining the signal arm against chatter when in the inoperative position and also to assist the sliding movement of the inner end 27 of the member 25 upon the arm 28 when the signal is being swung from the operative into the inoperative position, which necessitates an outward movement of such end 27 upon the arm 28.

Upon reference to Figures 2 and 7 of the drawings, it will be observed that as my signal arm is mounted upon the pin 6 which extends through the hinge and also lies against the door when in the inoperative position, so that when the door is opened the signal will also swing forwardly as if moving into the signalling position and become illuminated, with the result that the lens 17 will become visible and at night warn that the door is open.

From the foregoing description, it will be readily apparent that I have devised an extremely simple form of direction indicating signal which can be readily mounted upon most standard types of automobile bodies without causing disfigurement of the body or great mechanical knowledge on the part of the person installing the device. It will also be apparent that I have devised a signal of extremely simple construction, and consisting of a minimum number of parts in which simplicity and reliability have both been attained.

What I claim as my invention is:

1. A direction indicator for automobiles comprising, a signal, and a signal supporting pin positioned in one of the automobile door hinges in lieu of the hinge pin thereof.

2. A direction indicator for automobiles comprising, an operable signal, means whereby the signal is operated, and a signal supporting pin positioned in one of the automobile door hinges in lieu of the hinge pin thereof.

3. A direction indicator for automobiles comprising, a swingable signal arm, means for swinging the signal arm in a horizontal plane, and a signal arm supporting pin positioned in one of the automobile door hinges in lieu of the hinge pin thereof.

4. A direction indicator for automobiles comprising a swingable signal arm, mounted exteriorly of the automobile body, means for operating the signal arm positioned interiorly of the body, a connection extending through the body between the operating means and the signal arm, and a signal arm supporting pin positioned in one of the automobile door hinges in lieu of the hinge pin thereof.

5. A direction indicator for automobiles comprising, a swingable signal arm adapted to extend horizontally along the outside of one of the automobile doors when in the inoperative position and swing in a horizontal plane into the operative position, means for swinging the signal arm, and a signal arm supporting pin positioned in one of the door hinges in lieu of the hinge pin thereof.

6. A direction indicator for automobiles comprising a swingable signal arm mounted upon the body, means for operating the signal arm, and a flexible curved rod connection extending from a point intermediately of the length of the swingable signal arm to the operating means.

7. A direction indicator for automobiles comprising a swingable signal arm adapted to extend horizontally along the outside of an automobile body when in the inoperative position, a horizontally swingable signal operating means positioned interiorly of the body, and a flexible curved rod extending through an orifice in the body from a point intermediately of the length of the swingable signal arm to the swingable operating means.

8. A direction indicator for automobiles comprising, a swingable signal arm adapted to extend horizontally along the outside of an automobile body when in the inoperative position and to swing forwardly in a horizontal plane into the signalling position, a signal arm supporting pin positioned in one of the door hinges in lieu of the hinge pin thereof, a horizontally swingable signal operating means positioned interiorly of the body, and a flexible unitary curved connection extending through an orifice in the body between the swingable signal arm and the swingable operating means.

9. A direction indicator for automobiles comprising, a swingable signal arm adapted to extend horizontally along the top of the door of an automobile body when in the inoperative position and to swing forwardly in a horizontal plane into the signaling position, a signal arm supporting pin positioned in the top door hinge in lieu of the hinge pin thereof and about which the signal arm swings, a horizontally swingable signal operating means positioned interiorly of the body, a flexible unitary curved connection extending through an orifice in the door between the swingable signal arm and the swingable operating means, the outer end of the flexible connection being pivotally secured to the signal arm and the inner end of the connection being slidably secured to the swingable signal operating means, and resilient means against which the slidable end of the flexible connection moves when the signal arm is swung.

JAMES LEO McGRANE.